A. N. CRAWFORD.
WATER CLOSET.
APPLICATION FILED MAR. 5, 1913.
1,083,319.
Patented Jan. 6, 1914.
2 SHEETS—SHEET 1.
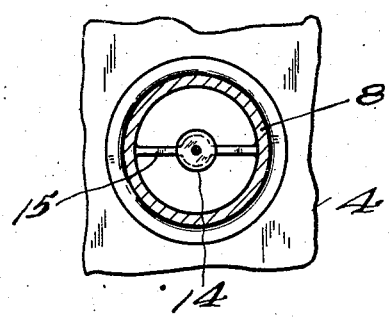
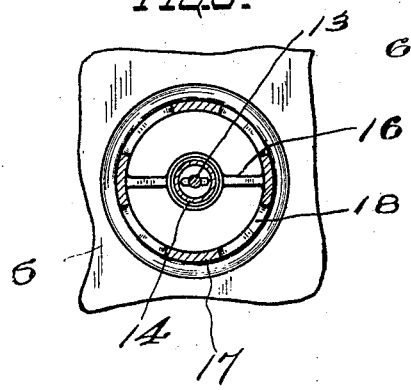
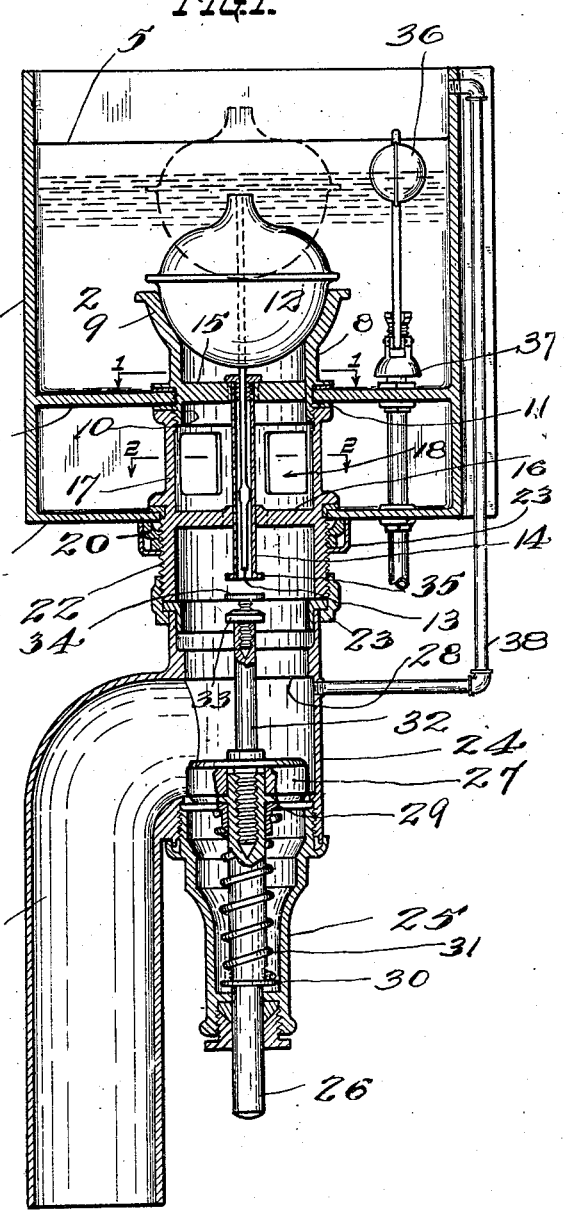
ALBERT N. CRAWFORD.
INVENTOR.
WITNESSES:
ATTORNEY.

A. N. CRAWFORD.
WATER CLOSET.
APPLICATION FILED MAR. 5, 1913.
1,083,319.
Patented Jan. 6, 1914.
2 SHEETS—SHEET 2.
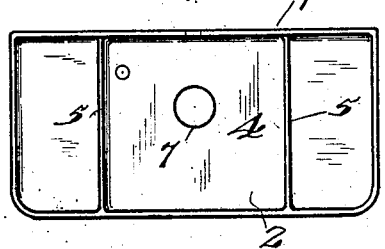
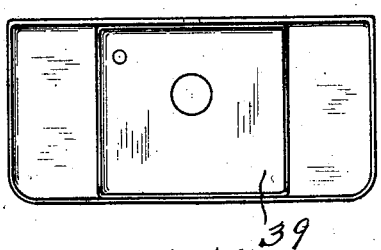
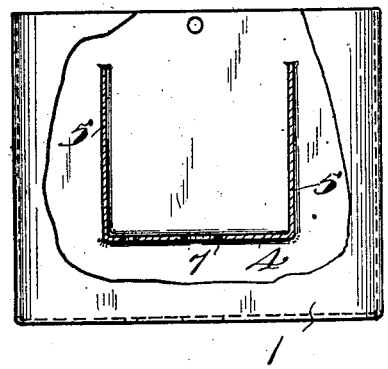
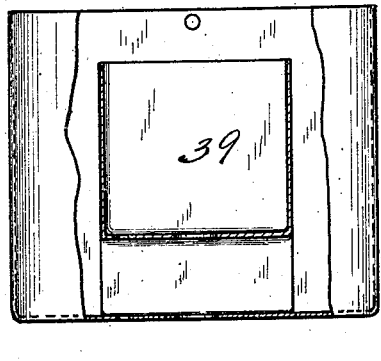
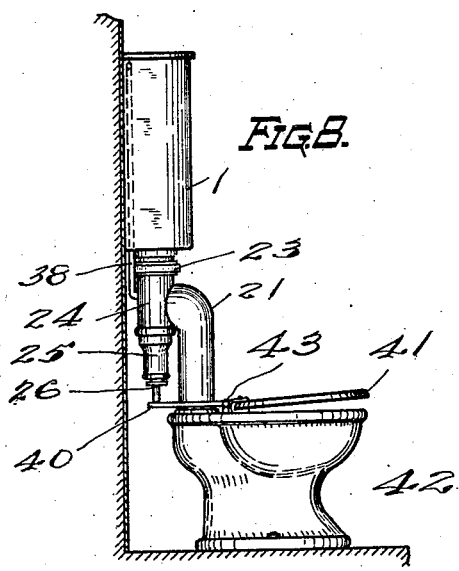
WITNESSES:
W. A. Hirtle
C. K. Davis
ALBERT N. CRAWFORD.
INVENTOR.
BY Thomas N. Harris
ATTORNEY.

UNITED STATES PATENT OFFICE.

ALBERT N. CRAWFORD, OF PITTSBURGH, PENNSYLVANIA.

WATER-CLOSET.

1,083,319.   Specification of Letters Patent.   Patented Jan. 6, 1914.

Application filed March 5, 1913. Serial No. 752,057.

*To all whom it may concern:*

Be it known that I, ALBERT N. CRAWFORD, a citizen of the United States, residing at Pittsburgh, in the county of Allegheny and State of Pennsylvania, have invented certain new and useful Improvements in Water-Closets, of which the following is a specification.

The present invention relates to improvements in water closets, and is designed especially to provide a device of this character with a flushing apparatus that will furnish a variable supply of water for the purposes required.

In water closets of the sanitary type as now in use most of the closets use the same quantity of water for flushing purposes, notwithstanding the fact that the same quantity is not necessary in all cases.

The object of my invention is the provision of means whereby a minimum or a maximum quantity of water may be used, as selected, to flush the closet bowl. In this manner sufficient water may be used to accomplish the purpose, using sometimes a minimum and sometimes a maximum quantity as desired.

In the accompanying drawings I have illustrated one complete example of the physical embodiment of my invention, and a modified form of construction of the flush tank, constructed according to the best mode I have so far devised for the practical application of the principles of the invention.

Figure 1 is a vertical central sectional view of the flush tanks and apparatus. Fig. 2 is a horizontal section on line 1—1 of Fig. 1. Fig. 3 is a similar view at line 2—2 Fig. 1. Fig. 4 is a top plan view of the flush tank, showing a compartment formed with integral walls within the flush tank. Fig. 5 is a front elevation of the tank of Fig. 4 with a portion of the front broken away and showing the inner compartment or tank-walls in section. Fig. 6 is a top plan view showing a separate tank of smaller capacity located within the larger tank. Fig. 7 is a front elevation of Fig. 6 showing the inner tank-walls in section. Fig. 8 is a side view of a water closet embodying the novel features of my invention.

In the preferred embodiment of my invention as clearly illustrated in Fig. 1, I employ a flush tank 1 having formed therein a compartment 2 whose bottom 4 and sides 5 are integral with the walls of the tank 1. The tank 1 has a perforated bottom 6 and the compartment 2 communicates with the interior of the tank 1 through large perforation 7 in the bottom wall 4 of the inner compartment 2.

Within the inner compartment 2 is located a sleeve 8 formed with a flaring mouth 9, and has its threaded lower end 10 projecting through the perforation 7 in the compartment bottom 4. Usual packing rings or gaskets 11 are provided to prevent leakage from the smaller inner compartment to the larger, outer, tank.

Within the flaring mouth of the sleeve 8 is seated a hemispherical valve 12 whose stem 13 is guided in the plunger tube 14. This tube 14 is capable of vertical movement in the perforated spiders 15 and 16, the former being cast integral with the sleeve 8 and the latter integral with the sleeve 17 which is screwed on the end 10 of the sleeve 8. The sleeve 17 is provided with a series of openings 18 establishing communication between the large tank and the interior of the sleeve, and gaskets 20 are utilized to provide water tight joints.

The flush pipe 21 is attached at the lower threaded end 22 of the sleeve 17 by means of the union or coupling 23, a tubular portion or sleeve 24 being formed integral with the flush pipe 21.

Within the lower open end of the sleeve 24 a casing 25 is threaded, and within the casing is inclosed a spring pressed plunger bar 26 formed with a head or piston 27. The head 27 is adapted to move vertically within the sleeve 24, and when at its upper position closes the upper end of the sleeve by seating against the shoulder or ring 28, thus closing water against exit through the flush pipe 21.

The under side of the piston or head 27 fits in a seat in the lower end of the sleeve 24 and rests on the sleeved-spider 29, between which and the rigid ring 30 on the stem 26, the spring 31 is interposed.

An extension 32 projects upwardly from the head 27, and an adjustable head is formed on the extension by means of the screws 33 and 34, which, as clearly seen in Fig. 1 is adapted to contact with the head 35 on the tubular plunger 14.

A float 36 actuates the usual valve 37 to admit water to the inner compartment 2, and an overflow pipe 38 is adapted to carry off any overflow from the tank 1 to the flush pipe 21 through its sleeve 24.

In the modification of Figs. 6 and 7 the inner compartment is formed of a separate vessel or tank 39 located within the large tank and suitably fastened therein.

In Fig. 8 the application of the device is illustrated. The plunger bar 26 is shown in contact with the lever end 40 attached to the seat 41 which is pivoted on the bowl 42 at 43.

In operation, assuming that the bowl requires a minimum amount of water to flush it, say two gallons, the seat is pressed and held down momentarily. Pushing down on the seat lifts the lift rod 26, against the spring 31 until the head or piston 27 contacts with the shoulder 28 thus closing water against exit through pipe 21. The upward movement of the lift rod also causes the screw 34 at the end of the extension 32 to engage and lift the plunger tube 14 and the stem 13 with it, thus lifting the valve 12 from its seat 9 and permitting the contents of the compartment 2 to flow down into the lower part of the tank 1 and also filling the sleeve 22 above the piston 27, which it will be remembered is closing the upper open end of the sleeve 24. When pressure is removed from the seat 41 the spring 31 and weight of the water cause the piston 27 to descend to its lower seat, and the contents of the lower part of the tank 1 is permitted to flow through the openings 18, sleeve 22, and flush pipe 21 to the bowl. The descent of the water level in the compartment 1 opens the water inlet valve 37, through the movement of the float valve, and after the valve 12 returns to its seat the inner tank or compartment again refills. Should a flushing charge equal to the capacity of the tank and compartment be desired, the seat is held depressed a longer time, and consequently the valve 12 is held suspended from its seat for a time sufficient to permit both the tank and the compartment to fill through the movement of the ball inlet valve as usual. When the tank and compartment are both filled, the ball valve automatically shuts off the inlet of water. Now with both tank and compartment full, the seat is released, the valve or piston 27 falls and the water from both the tank and compartment flow down through the flush pipe as will be understood. After this latter flushing, the compartment only, is again filled by the ball valve inlet.

Having thus fully described my invention, what I claim as my invention is:—

1. In a flushing apparatus the combination of a tank having a large compartment and a small compartment, a sleeve projecting through the bottom of the large compartment forming an outlet and passing through the small compartment, a flush pipe connected to the small compartment, a valve between the tank and flush pipe, a float valve adapted to seat in said sleeve having its stem projecting downwardly, and a stem on the first valve adapted to contact with the stem of the second valve and lift said valve from its seat as the first valve is opened.

2. In a flushing apparatus the combination with compartments, an open sleeve in the lower compartment opening in the upper compartment and projecting below the lower compartment, a flush pipe connected to the sleeve, a valve seat between said pipe and tank and a valve to close said seat having an upward extension, an outlet float valve in the upper compartment, a stem on the float valve, and said extension and stem adapted for contact for opening and holding open the outlet valve when said valve seat is closed, whereby a minimum quantity may be obtained from the lower compartment, and a maximum quantity obtained from both compartments.

In testimony whereof I affix my signature in presence of two witnesses.

ALBERT N. CRAWFORD.

Witnesses:
W. A. HIRTLE,
JOHN F. SWEENY.

---

Copies of this patent may be obtained for five cents each, by addressing the "Commissioner of Patents, Washington, D. C."